United States Patent
Tual et al.

[19]

[11] Patent Number: 5,992,192
[45] Date of Patent: Nov. 30, 1999

[54] LOCK-HANDLEBAR COMBINATION

[76] Inventors: Véronique Tual; Christine Tual, both of Trappentreustrasse 36, D-80339 Munich, Germany

[21] Appl. No.: 08/952,294
[22] PCT Filed: May 2, 1996
[86] PCT No.: PCT/DE96/00750
§ 371 Date: Dec. 22, 1997
§ 102(e) Date: Dec. 22, 1997
[87] PCT Pub. No.: WO96/34790
PCT Pub. Date: Nov. 7, 1996

[30] Foreign Application Priority Data

May 3, 1995 [DE] Germany .......................... 195 16 243

[51] Int. Cl.$^6$ .................................................. B60R 25/00
[52] U.S. Cl. .................................. 70/233; 70/18; 224/420
[58] Field of Search ................................. 70/233, 14, 18; 74/551.1, 551.3, 551.7, 551.8; 224/935, 420, 448

[56] References Cited

U.S. PATENT DOCUMENTS

| | | | |
|---|---|---|---|
| 1,629,859 | 5/1927 | Burke | 224/420 X |
| 4,870,843 | 10/1989 | Lundberg | 70/18 X |
| 5,069,049 | 12/1991 | Shieh | 70/233 X |
| 5,127,562 | 7/1992 | Zane et al. | 70/233 |
| 5,133,568 | 7/1992 | Bauerman | 224/420 X |
| 5,138,901 | 8/1992 | Dabandjian et al. | 70/233 X |
| 5,226,341 | 7/1993 | Shores | 70/233 X |
| 5,353,663 | 10/1994 | Samuelson | 70/233 X |
| 5,408,212 | 4/1995 | Meyers et al. | 70/233 X |
| 5,488,844 | 2/1996 | Winner | 70/18 |
| 5,546,776 | 8/1996 | Sun et al. | 70/233 |
| 5,558,349 | 9/1996 | Rubin | 70/233 X |
| 5,701,771 | 12/1997 | Bailey | 70/233 |
| 5,709,113 | 1/1998 | Godfrey | 70/233 |

FOREIGN PATENT DOCUMENTS

| | | |
|---|---|---|
| 2157756 | 10/1985 | United Kingdom . |
| 2259325 | 3/1993 | United Kingdom . |

*Primary Examiner*—Suzanne Dino Barrett
*Attorney, Agent, or Firm*—Donald R. Fraser

[57] ABSTRACT

A lock and handlebar attachment for a cycle comprised of a pair of oppositely curved end sections interconnected by parallel members at least one of which is selectively separable to enable the introduction of a fixed component to prevent the theft of the associated bicycle.

5 Claims, 11 Drawing Sheets

LOCK-HANDLEBAR COMBINATION

BACKGROUND OF THE INVENTION

The lock-handlebar combination relates to an invention which has two functions. On the one hand the lock-handlebar combination can be used as an anti-theft device, and on the other hand as an (additional) bicycle handlebar. U. S. Pat. Nos. 5,353,663, 5,226,341, 5,138,901 disclose known locks with a double function. In these known devices a shackle lock, when not being used as a lock, is secured to the handlebar. The U-shaped shackle projects forwards, so that it affords a possibility of support for the rider. The opportunity of support is restricted by this special construction of the lock and type of assembly.

SUMMARY OF THE INVENTION

In the present invention the underlying object is to offer the cyclist additional assistance in steering his bicycle, or a handlebar for his bicycle. by means of which on the one hand he can steer/control his bicycle, and which on the other hand he can use to secure his bicycle against theft.

BRIEF DESCRIPTION OF THE DRAWINGS

The invention will be explained with reference to embodiments by way of example and are illustrated in the accompanying drawings, in which.

DETAILED DESCRIPTION OF THE INVENTION

The lock-handlebar combination principally consists of a non-rusting material (e.g. steel) which cannot be separated either with bolt cutters, files or a saw or similar.

In order to avoid scratching the bicycle when the lock-handlebar combination is in use, its largest part is covered with a plastic layer. In addition, there is located on the handles of the lock-handlebar combination a foam-like or a rubber-like anti-slip covering 1 in order on one hand to make steering more pleasant for the user and on the other hand to prevent slippage during riding.

The lock-handlebar combination can adopt any imaginable shape or size. The drawings show two different shapes (round and angular) and also a plurality of different constructions.

The shape should be advantageous for steering purposes. It should offer the rider a plurality of possible ways of grasping it.

Figure 1:
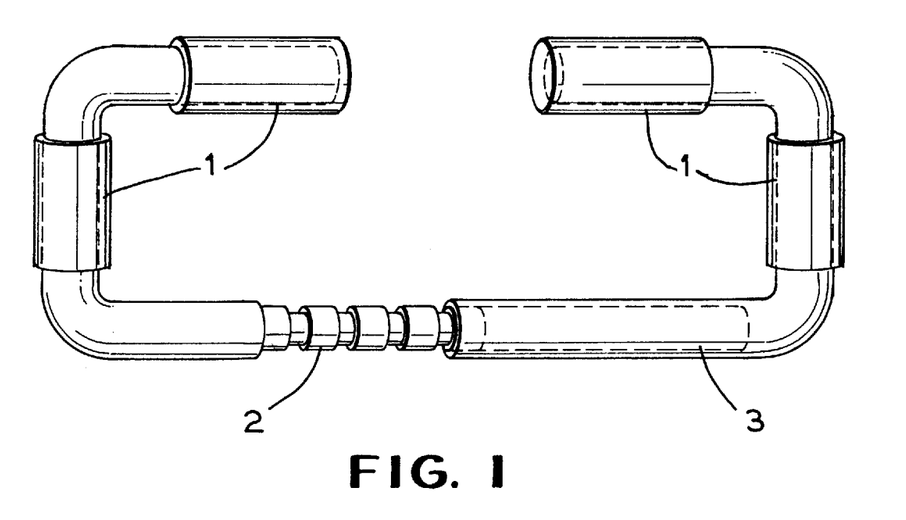
FIG. 1 is a fragmentary diagrammatic perspective view of an embodiment of the invention.
Figure 2:
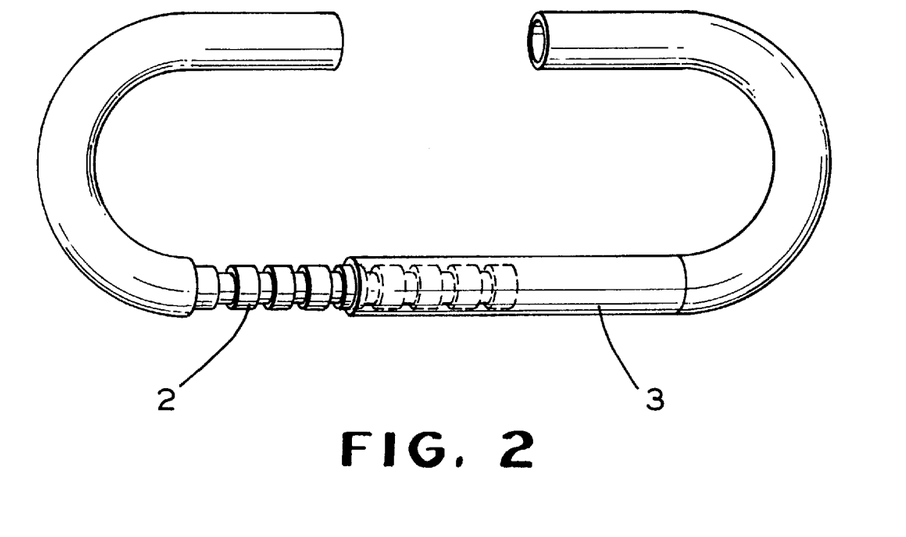
FIG. 2 is a fragmentary diagrammatic perspective view of an embodiment of the invention similar to FIG. 1 wherein the terminal portions of the handlebar are shaped differently from that illustrated in FIG. 1.
Figure 3A:
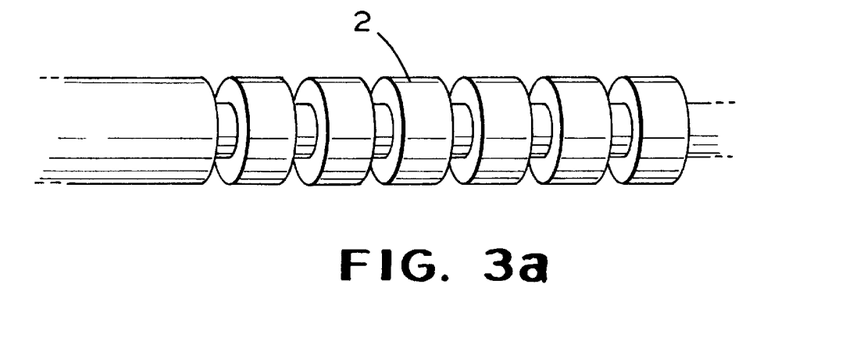
FIGS. 3a and 3b are fragmentary diagrammatic perspective views of differently notched handlebar assemblies.
Figure 3B:
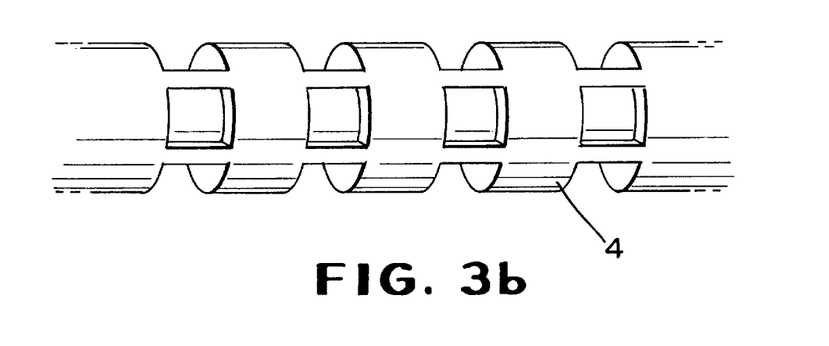
Figure 13:
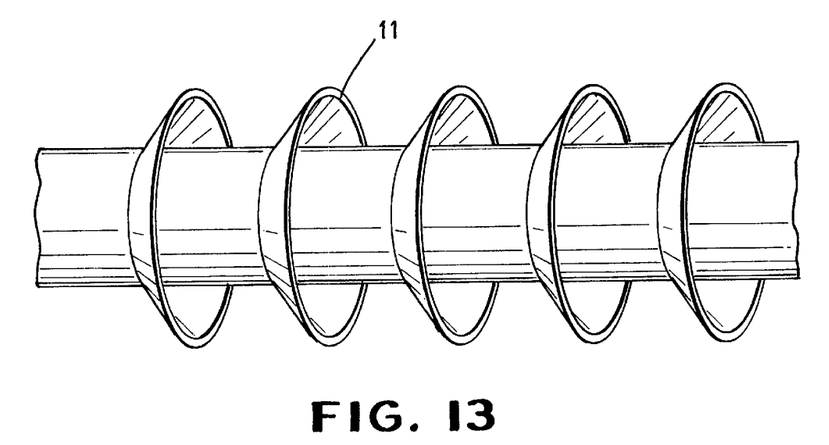
FIG. 13 is a fragmentary perspective view of a modified form of the notched bar in FIG 12.

FIG. 2 shows the side of the lock-handlebar combination having a notched bar 2 which is pushed into one or a plurality of hollowed portions, in this case a partly tubular member 3, so that as required the lock-handlebar combination can be pressed together or drawn apart. The bar-shaped member can be a notched member 2 or 4 as illustrated in FIGS. 1, 2–7 2, 14, 17a, 17b, and 18; or can be provided with an optional number of projections 11, as illustrated in FIG. 13; or can be neither notched nor provided with projections 11. In this way the lock-handlebar combination can be attached for security not only on the bicycle itself, but also, for example, additionally to a street lamp. There are various possible types of notching of the bar-shaped members, which are called bars in the following. Three different types of notching are specifically shown in FIGS. 3a, 3b, and 13.

Figure 4:
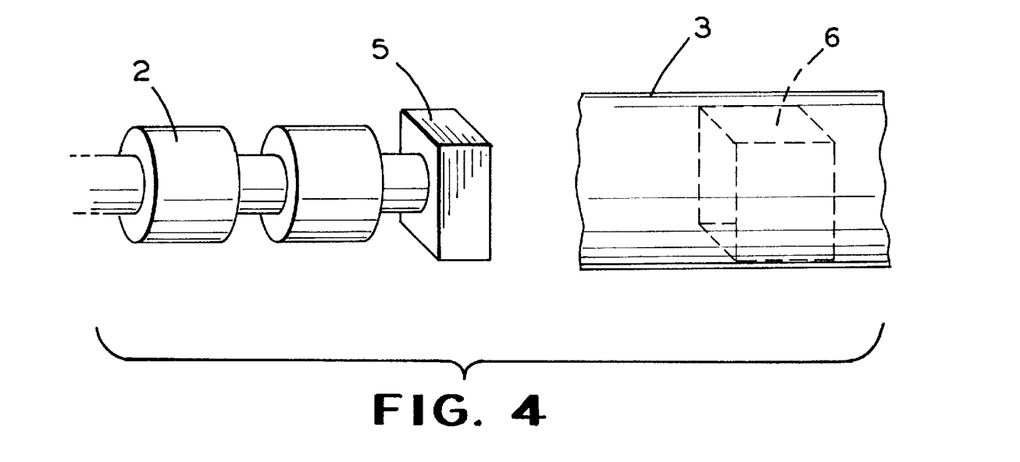
FIG. 4 is a fragmentary diagrammatic perspective view partly cutaway and in section illustrating cooperating polyangle members.

In the first type the bar 2 is continuously notched at equal or unequal intervals. In this way the lock-handlebar combination can be adjusted into any imaginable position. If the user wishes to use the lock-handlebar combination for steering, a mechanism must be present which fixes the notched rod in such a way that it can no longer be rotated. For this purpose, for example, there is mounted at the end of the notched rod a polygon, (for illustration in FIG. 4, a square has been shown). In the other (partly) tubular member 3 into which the bar is pushed, there is a counter-piece 6 fitting the polygon.

Figure 5:
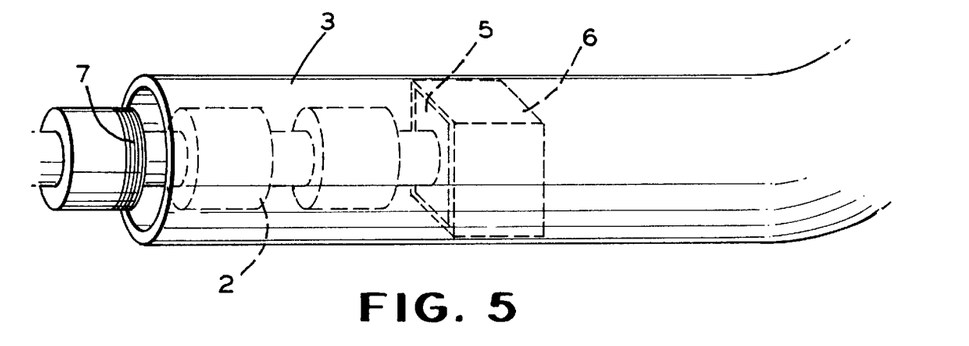
FIG. 5 is a fragmentary diagrammatic perspective view with portions cutaway illustrate an embodiment wherein a marking is used to indicate that the closure device is properly positioned for locking.
Figure 6:
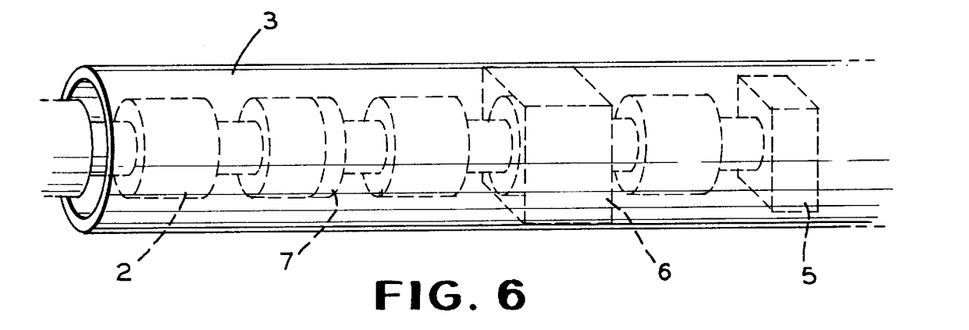
FIG. 6 is similar to FIG. 5 showing the marked notched element being telescoped completely within the cooperating members.

If it is desired to fix the bar for steering, the latter is pushed in until the polygon lies in the counterpiece. So that the user will know how far he must push, there is a marking 7 on the notched bar 2, as illustrated in FIG. 5. Only when the marking 7 is located at the edge of the partly hollow bar 3 is the polygon 6 in the counterpiece and the projection of the closure device 8 engaged, so that now the closure device can be locked. This system has not only the advantage of securing the notched bar 2, so that steering is possible without risk, but it is also possible to push the notched bar 2 entirely into the hollow member as illustrated in FIG. 6. In the second type of notching illustrated in FIG. 3b, the bar 2 is only partly notched as at 4 at equal or unequal intervals around its circumference. In this way this part can be securely fixed for steering without, for example, the necessity of providing an additional polygon. If the user wishes to steer, he adjusts a desired position and locks the closure device.

In the third type, the bar is provided all round with optionally large and optionally shaped projections 11, as illustrated in FIG. 13. If one pushes the portion of the lock-handlebar combination with the bar 2 into the opposite (partly) hollow portion, the closure device 8 mounted on the opposed part engages resiliently behind each projection. In order to secure the bar 2 for steering, the blocking system illustrated in FIGS. 4–6 already described can be used.

The construction and the method of operation of the lock-handlebar combination as a cycle lock will be explained in the following. As here also many different constructions are possible, those which are shown in the drawings are discussed.

Figure 7:
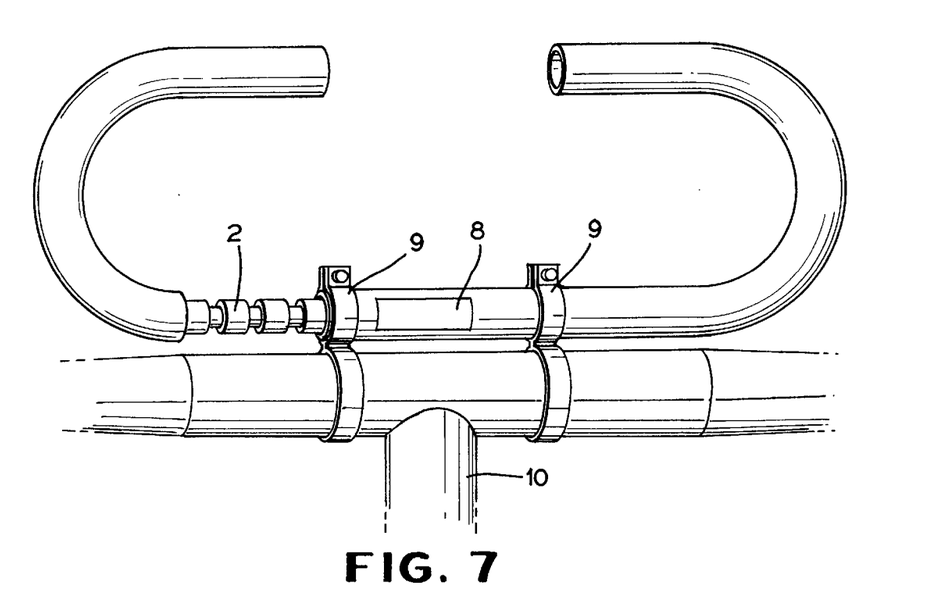
FIG. 7 is a fragmentary diagrammatic perspective view of a handlebar containing a closure device.

In the construction according to FIG. 7 there is located on one side a notched bar 2 or a bar provided with projections 11, which is pushed into the other side. Because one part is pushed into the other, the lock-handlebar combination can be pressed together or drawn apart. Thereafter the respective closure device 8 is locked. It is up to the user how he would like to secure his bicycle. He either passes one part around the cycle frame and the other around one of the wheels, then pushes the lock-handlebar combination together until it will go no further and locks the closure device 8. Thus, the bicycle can be moved from the ground, but cannot be ridden. In order to secure the cycle from being carried away by unauthorized persons, the user can pass one side around the cycle frame and the other around a street lamp or similar, press it together and then lock the respective closure device 8. In this way the bicycle is protected from being carried away.

Figure 8:
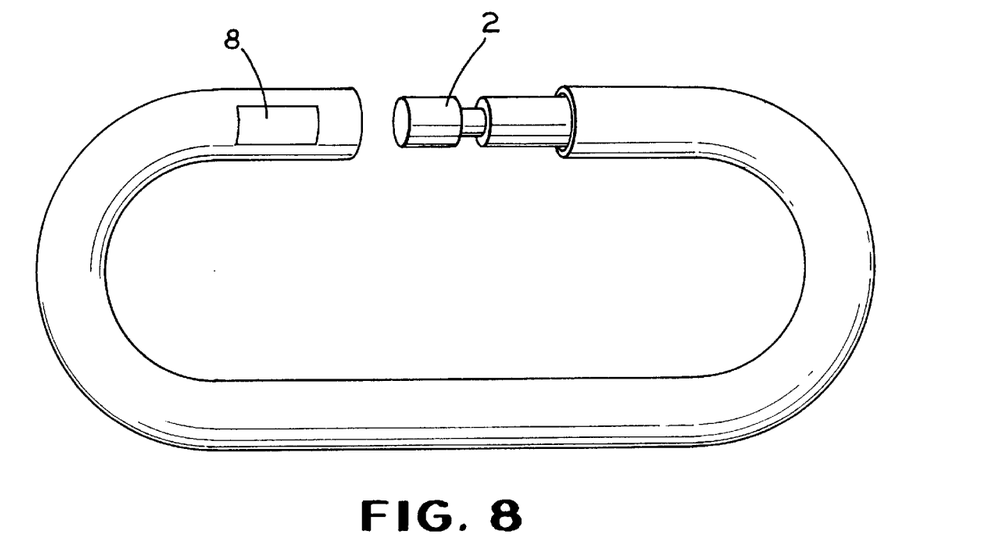
FIG. 8 is a fragmentary diagrammatic perspective view of a unitary handlebar assembly.

FIG. 8 shows the variation in which only one bar is located in one of the two handles. As only the bar itself can be moved, i.e. the lock-handlebar combination can neither be pressed together nor drawn apart, only one notch 2 or projection 11 is necessary. The bar 2 is pushed into the opposite handle until it resiliently engages in a closure device 8, and the latter can be locked.

Figure 9:
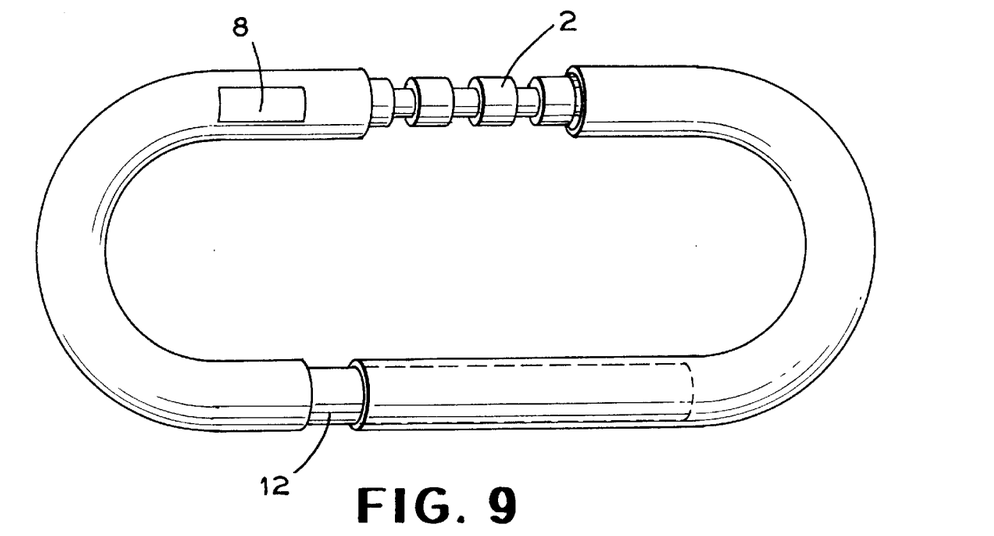
FIG. 9 is similar to FIG. 8 showing an embodiment wherein the handlebar is comprised of two cooperating members.
Figure 10:
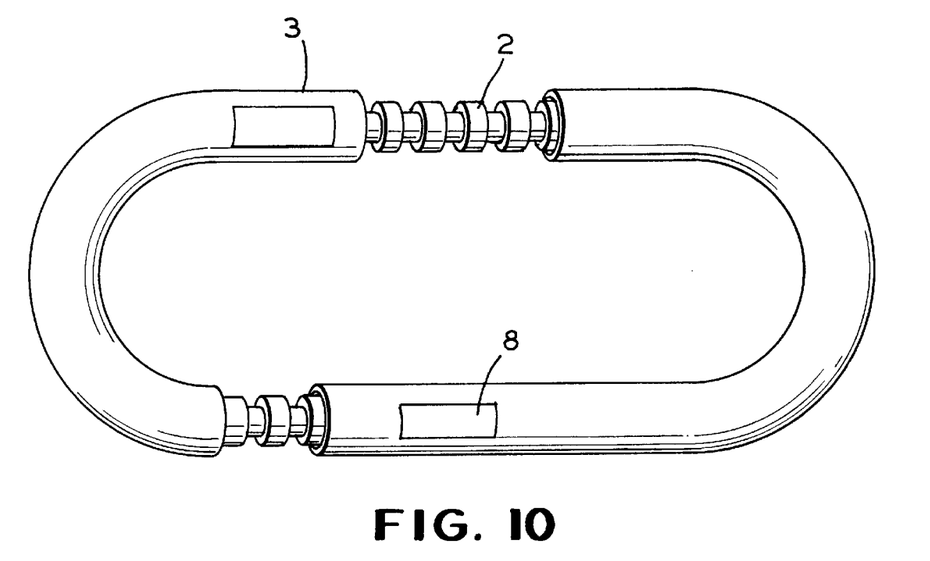
FIGS. 10 and 11 show similar handlebar assemblies formed of two cooperating tubular members.

FIG. 9 shows the variation in which two bars are provided. One bar 2 has a plurality of notches or projections 11, as illustrated in FIG. 13, is located in one of the two handles, and can be drawn out. Mounted on the other handle is the associated closure device 8. Located on the underside of the lock-handlebar combination is the second bar 12, which is not notched. In this way the part whose component part is that bar 12 can be pushed in or out so that the bicycle can additionally, for example, be secured to a street lamp.

In the variation of the lock-handlebar combination according to FIG. 8, not only is there a notched bar 2, but a second which is located in one of the handles. Naturally, the bars can also be provided with projections 11, as illustrated in FIG. 13.

As described, the lock-handlebar combination is applied to the bicycle and, for example, to a street lamp, or only to the cycle itself, and then the first closure device 8 is locked. Now the user pulls the second bar out of the handle until it partly or entirely disappears in the other handle and resiliently engages at that point. The user then locks the second closure device 8.

Figure 11:
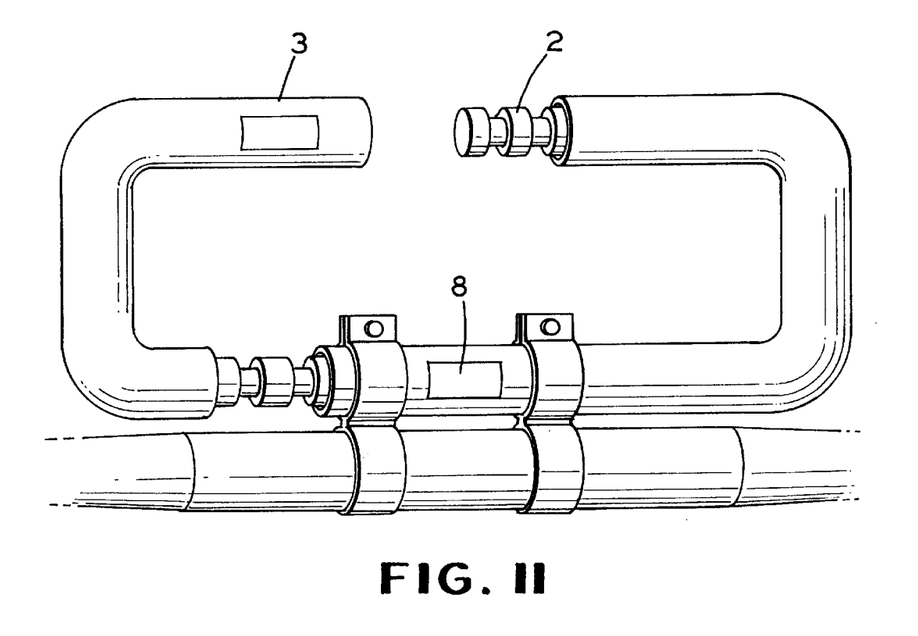
Figure 12:
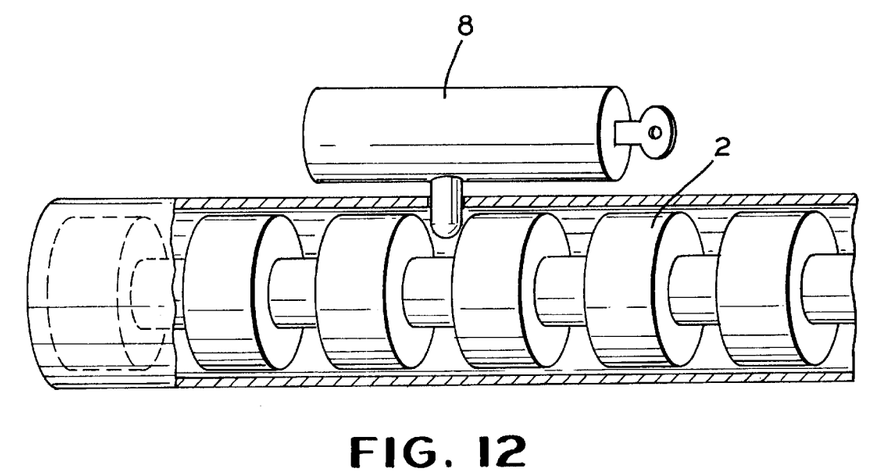
FIG. 12 is a fragmentary diagrammatic perspective view with portions cutaway to illustrate a locking device.
Figure 14:
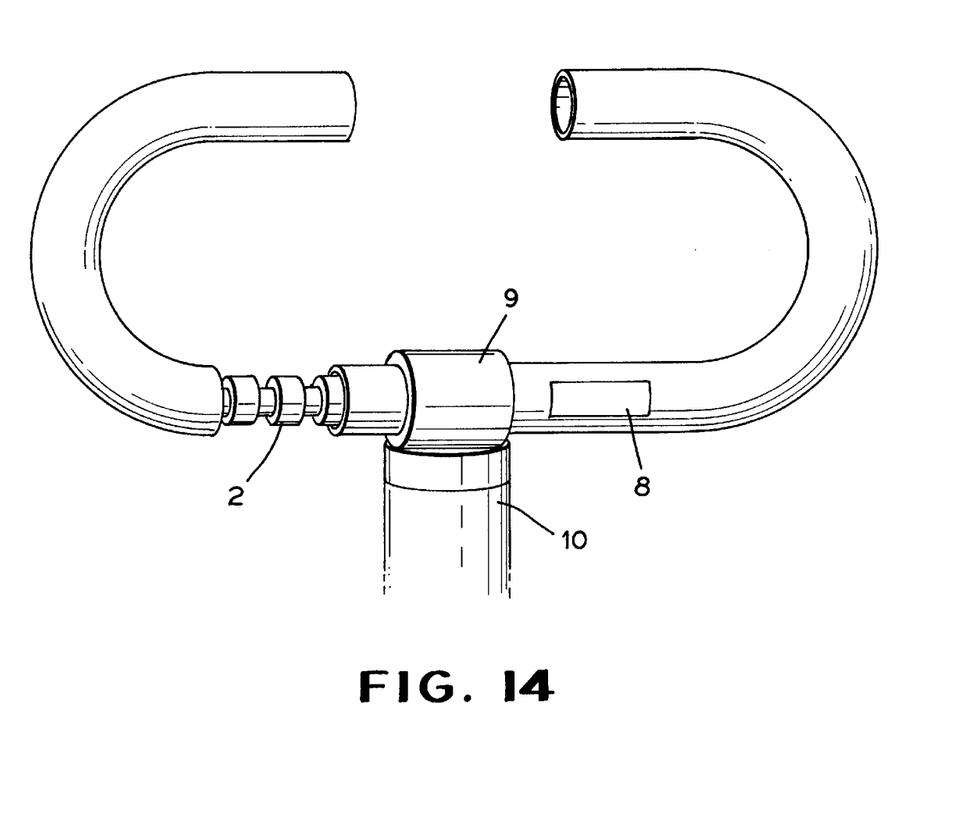
FIG. 14 is a fragmentary perspective view of a means for attaching the lock-handlebar to a bicycle.
Figure 15:
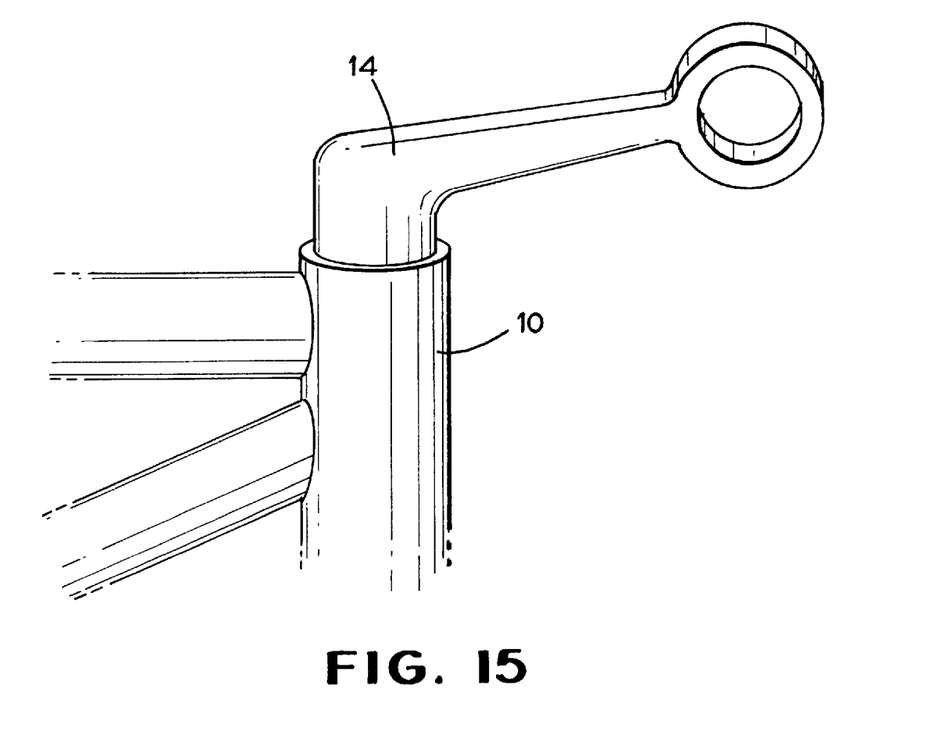
FIG. 15 is a fragmentary perspective view showing mechanism for mounting the lock-handlebar to the handlebar pillar.
Figure 16A:
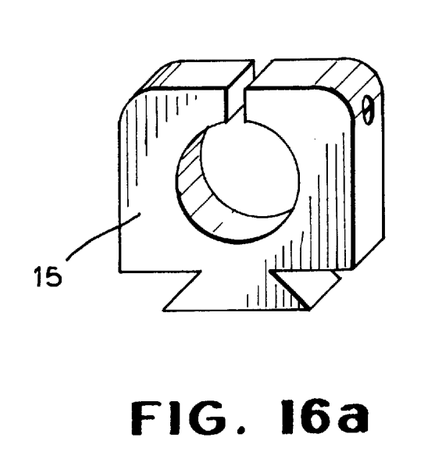
FIGS. 16a and 16b show dovetail components for attachment of handlebar components to a bicycle.
Figure 16B:
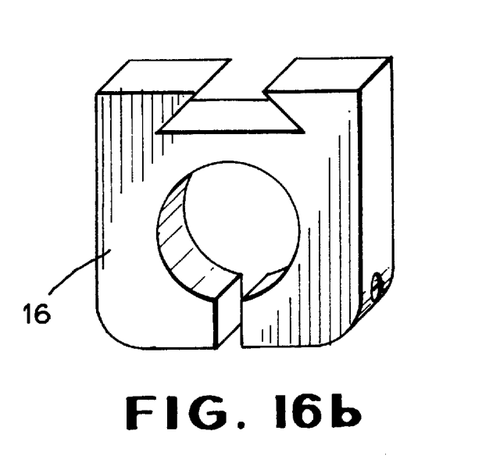
Figure 18:
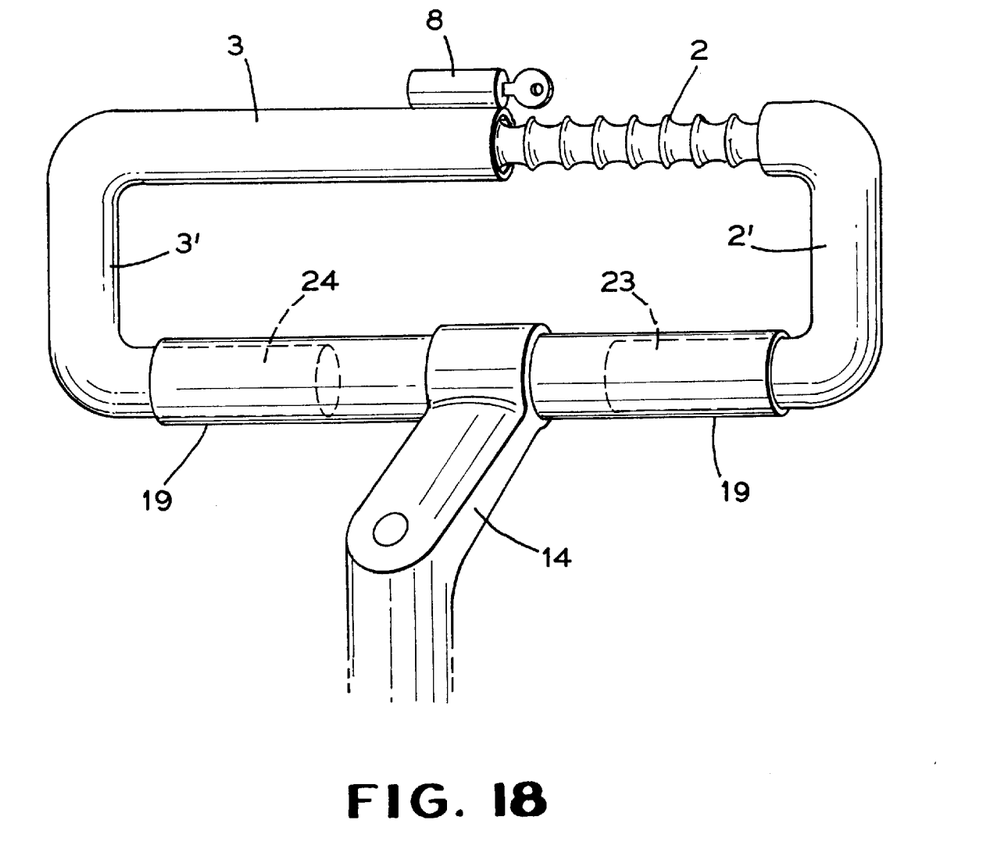
FIG. 18 shows the lock handlebar combination attached to the forepart of the handlebar.

The lock-handlebar combination is intended to be attached to the bicycle handlebars by means of attachment device 9 provided for that purpose, as illustrated in FIG. 14. As the center of the bicycle handlebar is already occupied by its own attachment to the bicycle, in order to assemble the lock-handlebar at least two attachment devices are to be provided, in order to give the lock-handlebar combination its necessary stability as illustrated in FIG. 11. A dovetail construction is illustrated in FIGS. 16a and 16b would, for example, be appropriate as an attachment device. In this case, its first component 15 will be screwed securely to the lock-handlebar combination, and its second component 16 securely screwed to the bicycle handlebars. If it is desired to secure the lock-handlebar combination to the bicycle handlebars, the two halves of the lock-handlebar with components 15 are respectively pushed from the outside inwards onto the components 16 of the bicycle handlebars and the lock-handlebar combination is locked as normal. Thus, safe steering is guaranteed. Naturally, it will also be possible to mount the lock-handlebar combination by only one attachment device to the handlebars. Naturally, the lock-handlebar combination can entirely replace the bicycle handlebars illustrated in FIG. 14. The lock handlebar combination can be secured either on to the handlebar pillar 10, as illustrated in FIG. 14, or to the forepart of the handlebar 14 by an appropriate attachment as illustrated in FIG. 18.

Figure 17A:
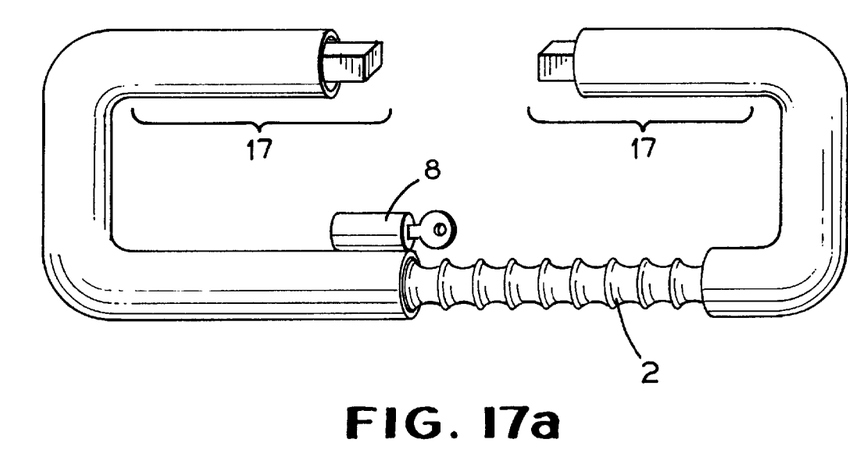
FIGS. 17a and 17b show a handlebar lock arrangement wherein the handle elements are received within the bicycle handlebars.
Figure 17B:
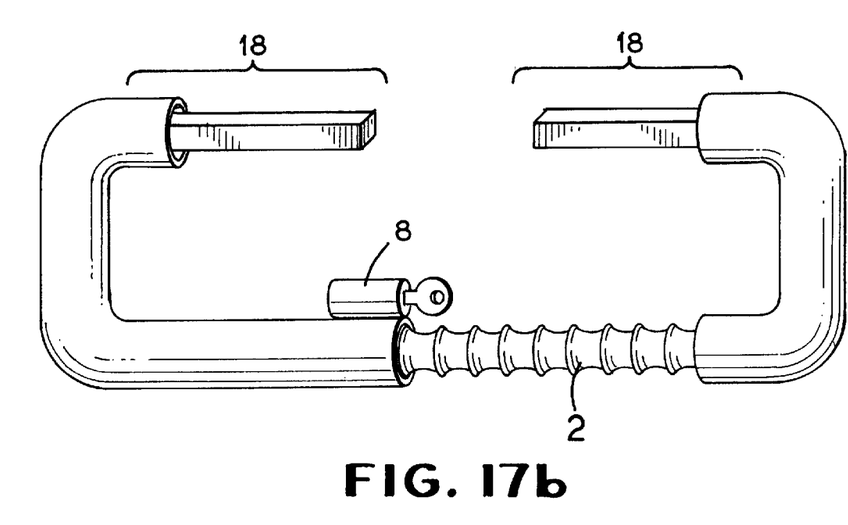

It is also possible to push the handles 17, 18 of FIGS. 17a and 17b into the ends of the bicycle handlebars. In this case, the handles should be (partly) polygonal in shape, as well as the counterpieces which are located in the ends of the bicycle handlebars.

Figure 19:
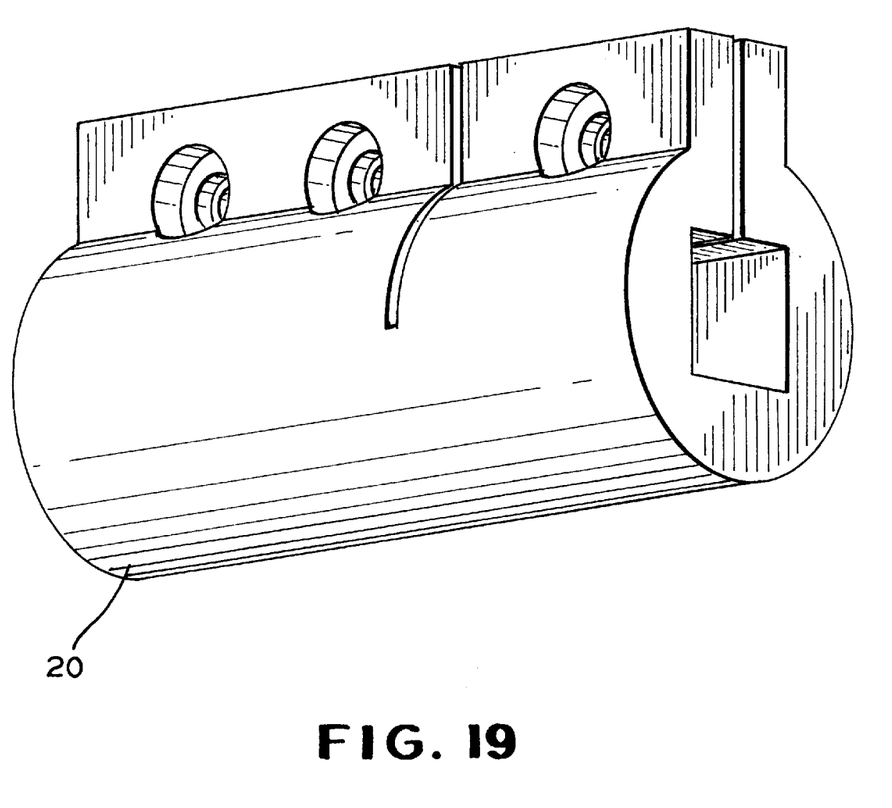
FIG. 19 is a perspective view of an adapter having an interior configuration suitable for handle bar components having a polygonal cross-section.

As conventional bicycle handlebars do not have polygonal counterpieces in their rends, there thus must be an adapter 20 for retro-fitting as illustrated in FIG. 19, which on the one hand is compatible with almost all types of bicycle handlebars and on the other hand can be screwed to the ends of the bicycle handlebars, is not inconvenient, and can only be stolen with difficulty. A further possibility of pushing the handles of the lock-handlebar combination into the ends of the cycle lock and simultaneously to secure them resides in shaping the handles in a conical configuration and pressing them by a rotary mechanism into the ends of the bicycle handlebar, in order then to lock the lock-handlebar combination in this position.

The advantages of this invention reside in the fact that the cycle lock has a further useful function and thus does not represent "dead weight" on the bicycle. Because the lock-handlebar combination can entirely replace the handlebar, it would be senseless to break open the security lock, as consequently it would no longer be possible to ride away. This means that the lock-handlebar combination can represent a disincentive for vehicle thieves.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A lock handlebar combination for attachment to the steering column of a cycle consisting of:

a main body portion including a pair of spaced apart end sections, the end sections interconnected by spaced apart parallel side sections, at least one of the side sections being integral with the end sections, the other of the side sections integral with the end sections and including hollow stock, the hollow stock providing a gap;

a locking plunger received within the hollow stock of the other of the side sections of said main body, said plunger being selectively movable within the hollow stock from a first position to a second position, the first position exposing the gap in the hollow stock and the second position closing the gap in the hollow stock; and attachment means for securing said main body portion to the steering column of a cycle whereby the side sections of said main body are maintained parallel to one another.

2. The combination defined in claim 1 wherein said plunger includes spaced apart concentric notches.

3. The combination defined in claim 1 wherein one of the end sections of said main body is pivotally movable with respect to the other end section.

4. The combination defined in claim 3 including a blocking mechanism to militate against relative pivotal movement of the end sections of said main body.

5. The combination defined in claim 1 wherein the attachment means includes a two pat dovetail construction.

* * * * *